Figure 6:
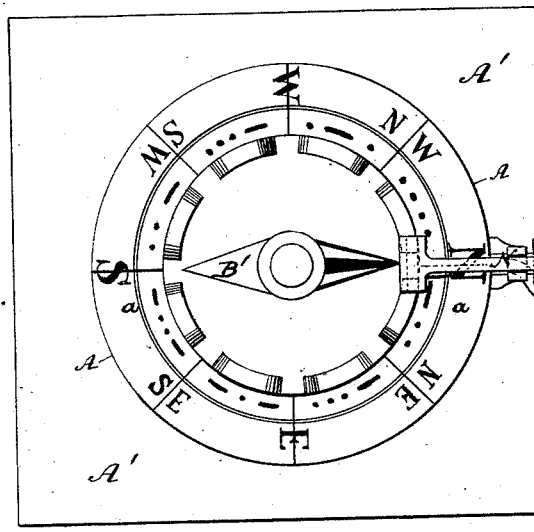

3 Sheets—Sheet 1.
W. B. BARKER.
Fog-Signal.
No. 216,820. Patented June 24, 1879.
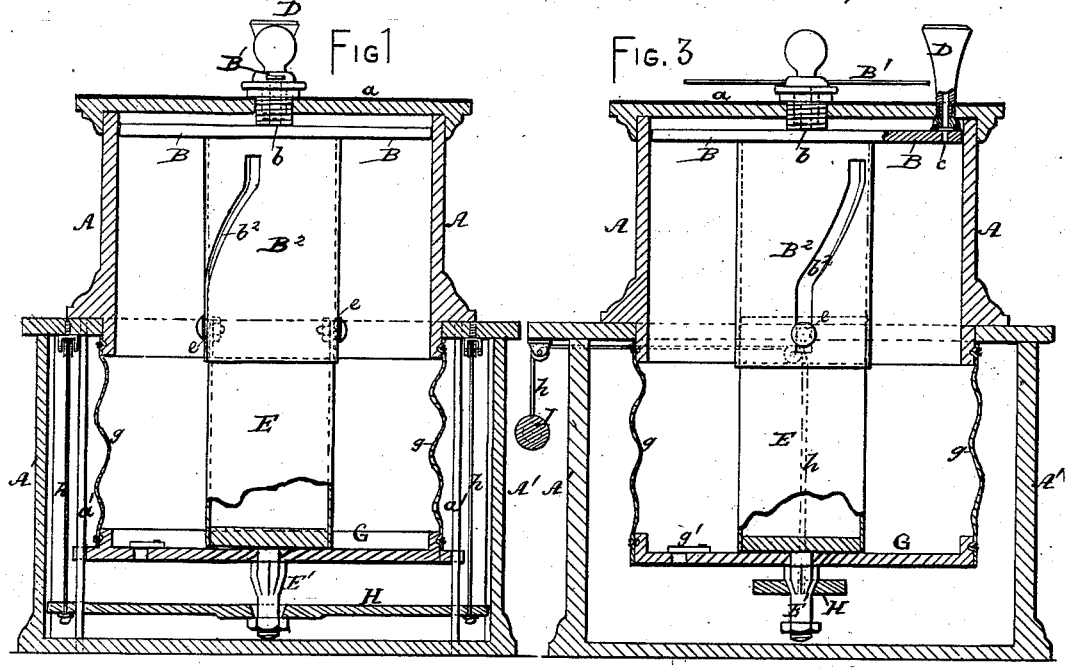
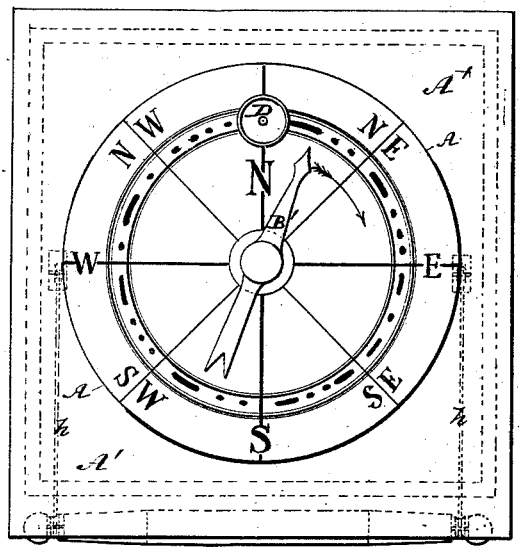
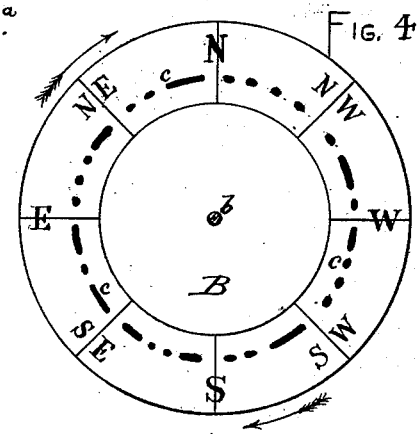
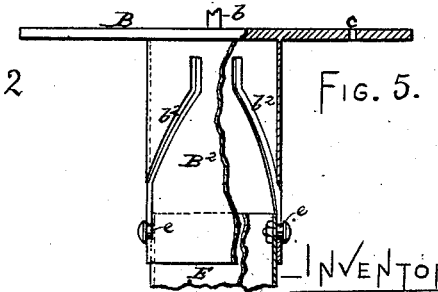
WITNESSES:
W. Colborne Brookes
Charles C. Stetson
INVENTOR
William B. Barker
by his attorney
T. D. Stetson 3 Sheets—Sheet 2.

W. B. BARKER.
Fog-Signal.

No. 216,820. Patented June 24, 1879.

WITNESSES:
W. Colborne Brookes
Charles C. Stetson

INVENTOR:
William B. Barker
by his attorney
T. D. Stetson

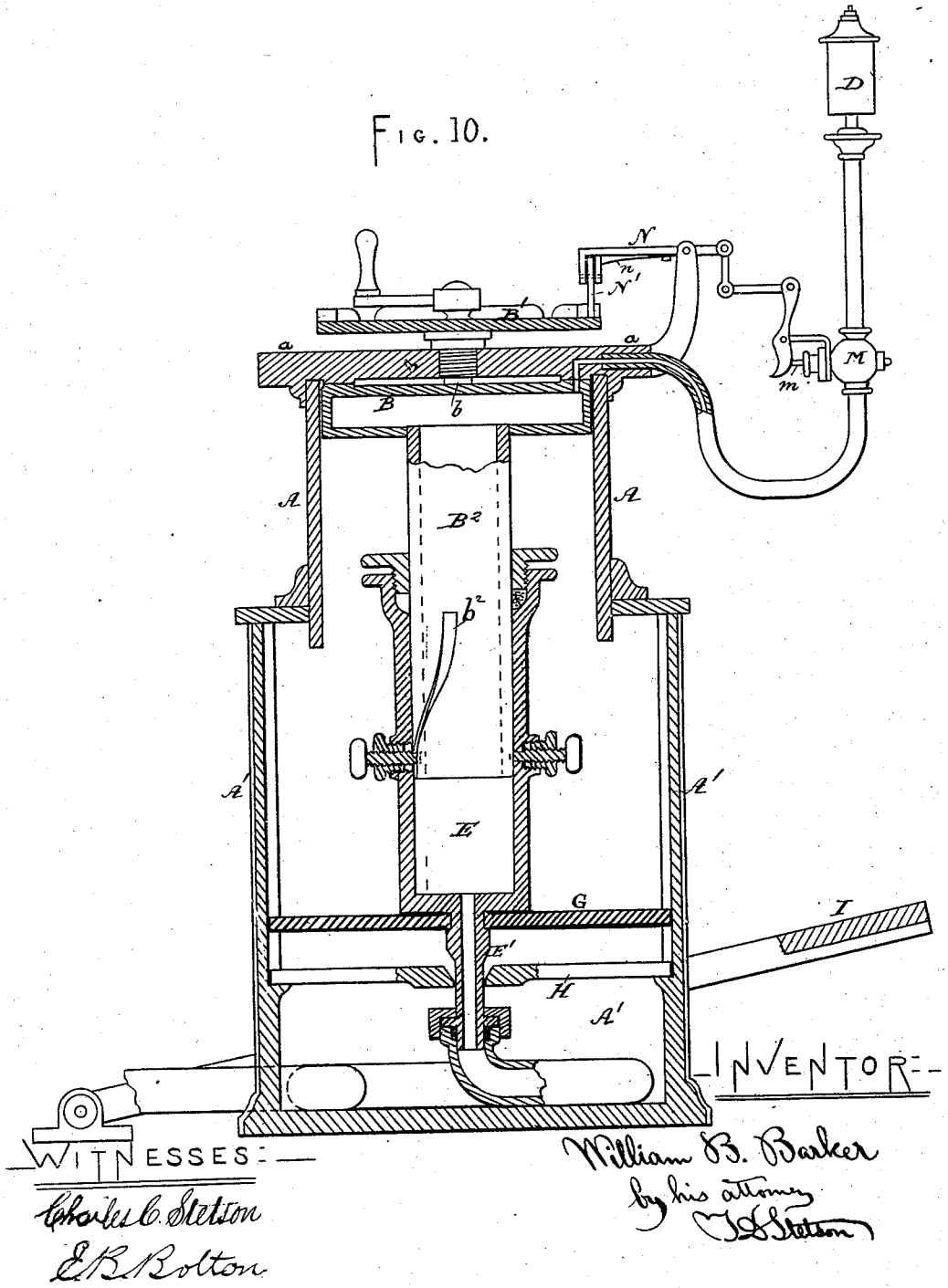

UNITED STATES PATENT OFFICE.

WILLIAM B. BARKER, OF HOBOKEN, NEW JERSEY, ASSIGNOR TO HIMSELF AND DAVID FORSHAY, OF NEW YORK, N. Y.

IMPROVEMENT IN FOG-SIGNALS.

Specification forming part of Letters Patent No. 216,820, dated June 24, 1879; application filed April 19, 1879.

*To all whom it may concern:*

Be it known that I, WILLIAM B. BARKER, of Hoboken, Hudson county, in the State of New Jersey, have invented certain new and useful Improvements relating to Fog-Signals, of which the following is a specification.

In many situations, and particularly in foggy weather, it is desirable to communicate intelligibly between vessels by sound. It has long been common to signal in a primitive manner. One blast means: "I propose to turn to the right;" two blasts, "I propose to turn to the left."

Steam-whistles, or even fog-horns, can, under favorable conditions, be heard several miles; but it usually requires a knowledge of more than the existence of an approaching vessel before we can intelligently communicate an intention to pass on either side of her. We must assume that she is running some course.

I have devised a system of signals by which every vessel may, by blasts of the steam-whistle or fog-horn, advertise as effectually as at present the simple fact of her existence to those who shall be so unlettered as not to know the code, and at the same time inform intelligent navigators of the course she is running. During the intervals the navigator listens sharply for distant sounds from other vessels. So soon as any one properly versed hears a sound, and, concentrating attention, observes the successions of the blasts, if my invention is used on both vessels, he knows not simply the existence of his neighbor, but also what course she is steering. Then each vessel will follow the rule of the road.

I have devised, in connection with a set of signals consisting of long and short blasts succeeding each other in varied order, convenient mechanical devices by which the signals are certain to be given with mathematical precision. I have elaborated this in connection with a device by which the same mechanism can also furnish the wind for the blast when steam is not available. In other words, I have devised a compact apparatus adapted for sea service, and where steam is not available have caused the same mechanism to not only graduate with certainty the successions of the sounds, but also to supply the motive power therefor.

The signals give the direction in which the vessel is moving or intends to move. I attain a sufficient approximation by dividing the circle in eight (8) parts: from north to northeast is one; from northeast to east another, and so on.

I have furthermore provided for an instant change by a simple movement, so that the signals will be changed when the vessel changes her course, or when a change is intended in her course; but so long as the vessel is kept steadily in any given direction the apparatus should give a constant repetition of the desired signal. A vessel running "north by east" will speak long, short, short—long, short, short—long, short, short—and so on indefinitely, the signals being separated by any interval of time desired, but which, according to law, should not be less than two minutes.

The following is a description of what I consider the best means of carrying out the invention.

The accompanying drawings form a part of this specification.

Figure 1 is a vertical section through the main portion, partly in elevation. Fig. 2 is a plan view. Fig. 2ª is a plan view of one of the parts detached.

Fig. 3 is a vertical section, partly in elevation, on a plane at right angles to that in Fig. 1. In this Fig. 3 the parts are in the same condition as in Fig. 1, except that the cross-bar which locks and unlocks the revolving parts, and which, by its forcible lifting, operates the bellows, is in this figure raised into the locked position, while in Fig. 1 it is lowered, and leaves the revolving parts unlocked.

Figs. 4 and 5 represent certain parts detached. Fig. 4 is a plan view of the part which I term the "disk." It works inside of the apparatus, and performs its function by the long and short holes arranged in a circle. The lettering is not essential, because it is out of sight; but I prefer to apply the letters to avoid mistake in putting the device together. Fig. 5 is an elevation, partly in section, showing the same disk and a portion of the connected part below.

The succeeding figures show modifications adapted to operate by the aid of steam.

Figure 6A:
Figure 7:
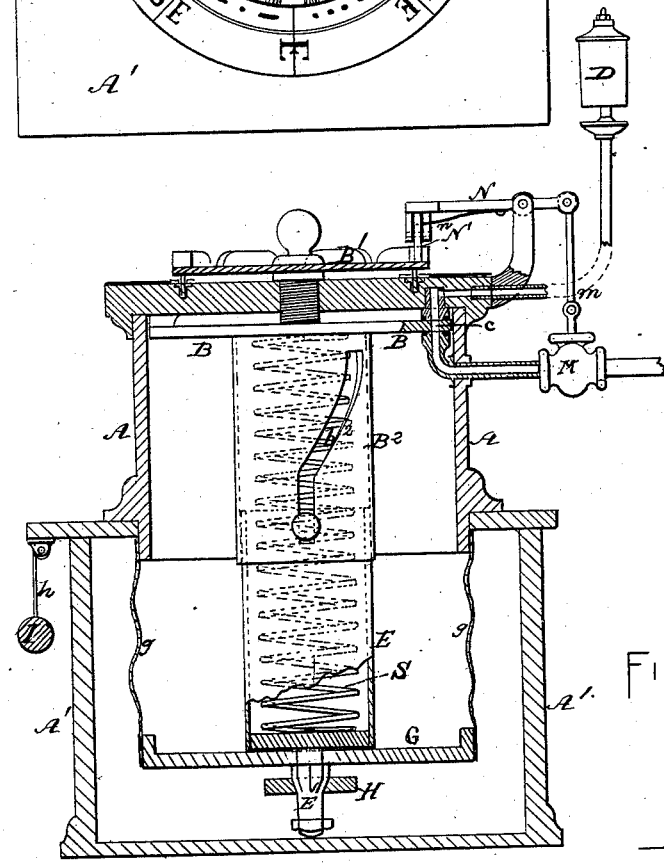
Figure 8:
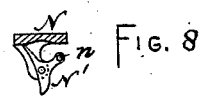
Figure 9:
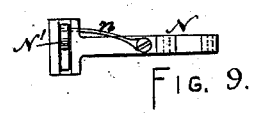

Fig. 6 is a plan view, and Fig. 7 is a corresponding vertical section, partly in elevation. Figs. 8 and 9 are detached parts of the modification shown in Figs. 6 and 7. Fig. 6a shows a modification of the cams in Fig. 6. Fig. 10 is a vertical section, partly in elevation, showing another modification.

Similar letters of reference indicate corresponding parts in all the figures.

A is an upright cylindrical box, supported on another and larger box, A'. B is an accurately-finished horizontal disk, capable of being turned on a center pivot, $b$, the upper end of which is provided with a knob or handle and the index-finger $B^1$. Turning the index $B^1$ turns the disk B. This disk is perforated near its periphery, the perforations arranged exactly concentric to the center of motion, and made of different lengths and differently arranged, as shown. This whole circular series of perforations I will designate by the single letter $c$. At one point over this circle $c$ a whistle, or other sounding device, is fitted in the cover of the box, pressing with gentle force, but tightly, upon the smooth upper face of the disk. Air or steam under pressure being supplied below the disk B, it will flow up through the several holes and fill the small space above it, which may in practice be either more or less than is shown, as, the box being tight, it cannot escape; but the whistle or horn D is presented in practically air-tight contact with the upper face of the disk. When the disk is placed so that one of the holes coincides with the whistle, the whistle speaks.

$B^2$ is a hollow cylinder of sheet metal, like one section of a telescope. It is permanently fixed to the under side of the disk B, and has two peculiarly-shaped slots in its sides, as shown.

E is a smaller cylinder, fitting within it like another section of the same telescope. Each is provided with a pin carrying a roller, $e$, which is adapted to travel in the slot $b^2$, and to correspondingly turn the disk when the cylinder E is raised and lowered. The turning presents the holes $c$ in the proper succession to the horn D, and, provided a sufficient pressure of air or steam be supplied, the signal is given by the proper succession of long and short sounds during such turning motion.

I can induce the required pressure of air by a bellows-like action at the same operation, which will now be described.

G is the lower board of the bellows. A bag of leather, oiled silk, or other flexible and tolerably air-tight material (marked $g$) connects the edges of this board G with the bottom of the box A.

H is a movable cross-bar, guided on upright rods $a'$, and actuated by cords or chains $h$, running over pulleys and connecting to a cross-bar, I, adapted to be strongly depressed at will by the hand or foot of the operator. I propose, under ordinary conditions, to actuate this by the foot. At each depression of the foot the bar H is raised, and with it the board G. By this movement not only is the cylinder E raised and strongly held against a turning motion, but the air previously received through a suitable valve is forced into the box A, and as the holes $c$ are successively presented as the disk B is partially turned on its axis $b$, the air actuates the fog-horn D.

In the above description I have assumed that the lower part, E, of the telescopic construction rests upon the board G, and is held in the same manner, so that it cannot turn. This is true of its conditions while the board G is being raised. It is important that it shall be strongly raised, and also held against turning, in order that its roller $e$ shall, by its action in the slot $b^2$, give the required rotation to the disk. The first part of the slot $b^2$ is upright. During the period while the rollers $e$ are rising through that part of the slots, there is no turning of the disk B, and consequently no hole is presented to allow the air to escape into the fog-horn; but the apparatus is during that period accumulating a pressure of air, so that when a little later the rollers $e$ enter the inclined parts of the slots $b^2$ and commence to turn the disk, there is a sufficient pressure of air below to induce a loud sound so soon as a hole is presented.

The continued rise of the board G, and consequent continued compression of the bellows G $g$, maintains the pressure during the operation.

At the extreme top the slot $b^2$ is again upright for a short distance. This permits a certain amount of movement of the bar H and board G after the signal is finished without altering the position of the disk B to allow for the ordinary variations in the action of the bellows in different conditions of stiffness, as operated by different men, without making any change in the succession of sounds which effects the signaling.

So far as yet described the operation is uniform, and the desired signal is repeated at each operation indefinitely.

The index $B^1$ is capable of being revolved over a dial, $a$, produced on the upper face of the box or case A, so that it indicates plainly the point of the compass for signaling which the apparatus is adjusted. Any required change produced by revolving the index and its attachments can be made without fear of mistake.

To the under side of the lower cylinder, E, is affixed an extension, E', which performs important functions. Its upper end is larger than the lower part, and is octagonal. The lower part is smaller and is cylindrical. This piece E' extends through an octagonal hole in the cross-bar H, which is guided by the rods $a'$. The hole in the bar H is of such size and form that when it is, by the action of the foot on the treadle I, raised into contact with the board G, it engages strongly on the octagonal part of E', and so locks the connected tube E rigidly against being rotated; but when the cross-bar H is lowered so that its hole receives the smaller cylindrical part near the lower end of the piece E', then the piece E' and its connections may be turned freely around. This latter condition obtains at each interval between the operations of my apparatus.

So soon as the foot is removed from the cross-bar or treadle I, the weight of the cross-bar H, or some attachment not represented, causes not only the bellows-board G to descend and the bellows to become filled with air by its induction through the valve $g'$, but also the cross-bar H descends farther, and, moving below the octagonal part of the piece E', sets the latter, and also the connected parts above, at liberty to be turned.

It will now be seen that during each interval between the operations of my apparatus, the hand of the attendant applied to the index $B^1$, or to the knob, or any other suitable attachment conveniently placed at the top, may turn the index instantly to any required part of the circle. In doing so the connection $b$ turns the disk B and presents a different part of the disk to the fog-horn D, so that at the next operation of the apparatus a different signal corresponding to the new position of the index $B^1$ will be given. In the turning of the disk B the attached cylinder $B^2$ will be correspondingly turned; so will also the lower cylinder, E, and the attachment E'.

On the next operation of the apparatus the depression of the treadle will bring up the cross-bar H and cause it to engage with the octagonal part of E' with the same firmness as before, but in a new position, it having been changed one-eighth, two-eighths, three-eighths, or any other part of a circle in the interior. The work will thenceforward proceed with the same certainty as before, and the signals will be given through the same fog-horn by the action of the same bellows; but being given through a different part of the circle $c$ in the disk B, the signals will possess the character peculiar to this other part of the circle. A change, for example, from north to east, will change the signal from long, short, short (the signal for north) to the signal for east—long, short, long—which it now commences to repeat indefinitely, as it had previously done the other.

In small vessels, or any vessels working short-handed, it is practicable to place this apparatus so that it may be worked by the man at the wheel; but where two are on watch the officer of the deck or man forward will operate the signal and relieve the helmsman. In emergencies, as when it is discovered that the course must be changed in consequence of proximity of another vessel threatening collision, the man at the wheel, in default of other orders, will instantly learn from the signal given the course which his vessel is expected to take. In other words, this apparatus at any elevated or convenient position on the ship, in addition to its function of informing the other vessel of its change of course, serves as an additional means of communicating orders to the helmsman of the vessel on which it is used. The helmsman, who in confusion failed to learn distinctly which way he was to put his helm, the instant he finds his own ship signaling southwest knows at once that he is expected with the helm, in addition to any trim of sails or other means that can be used, to put the ship as rapidly as possible on that course.

I have so far described the apparatus as prepared for sailing-vessels; but it is equally or more important on steam-vessels. The apparatus may, if desired, be used on a steam-vessel without any change, supplying the air and using a fog-horn exactly as above described. But it is important, not only on account of the increased power, but also from the different maneuvering expected and required of a steamer in event of a threatened collision, to employ the steam as the means for giving the signal, and to make the signals through an instrument which will be distinctly recognized as a steam-whistle.

Each steam-vessel should have one of my complete sets of apparatus adapted for sailing-vessels ready for use in case a derangement of the steam-power should require her assuming the character and making the signals due to a sailing-vessel.

Whenever steam is used a steam-whistle is substituted for the fog-horn D. This may be placed either in the position shown or at a considerably distant point, care being taken not to make the distance so great that the distinctness of the several pulsations or blasts will be lost. The steam may be admitted into the whole space under the disk; but it is for obvious reasons preferable to concentrate it on that part where it is required.

Fig. 7 is a section showing an arrangement which especially adapts the invention for use with steam. The same bellows apparatus shown in the preceding figures may be retained, giving any suitable outlet of moderate area to control the exit. Such a device may be used in all forms of my steam apparatus simply as a means to aid the judgment of the operator in regard to the rapidity of the movements. The bellows action is a very efficient moderator to prevent the device from being operated too fast.

Steam may be let on instead of air with very little change in the apparatus in other respects, provided some suitable means be applied to shut off the steam during the return motion of the foot or index; but it is also well to shut off the steam during the greater or less interval which occurs between the signals. In fact, the steam-pressure is only required in the brief period during which the holes $c$ are presented to serve as passages for the steam. To accomplish this I have an independent valve.

In Figs. 6 and 7, M is a small double valve, or balanced valve of any ordinary or suitable construction. It is operated by the slender stem $m$ and a connection to a lever, N, which turns on a fixed center, as shown, and is equipped with a trip lever or arm, N', which is rigid as a part of the lever N when actuated in one direction, and is hinged to fold easily when actuated in another direction. It is held in position by a spring, S.

In place of the index $B^1$ being a simple hand similar to the needle of a compass, I employ a disk having the hand painted or otherwise indicated upon the upper side thereof, and around the periphery of the said disk I arrange eight cams, corresponding with the eight main divisions of the compass, the said eight cams being so arranged that when the index $B^1$ is turned to any given point the cam corresponding with the signal to be given shall come into position to let steam on, so that steam shall pass the valve M during the period while the proper holes in the disk B are being presented for the passage of steam; but immediately the signal is completed it shuts it off, and it remains shut off during the reverse motion, the hinged arm N' readily yielding to allow the cam to pass idly backward under it without producing any effect.

To prevent the plate or disk which, when thus equipped, takes the place of the index $B^1$ from springing, I can provide one or more anti-friction rollers to support it on the under side.

Instead of a single cam to let on the steam for each signal, I propose in some cases to divide up the cams, so that they shall correspond with the holes in the disk B below. Such will open and close the valve M at each blast, the opening being always a little in advance and the closing a little after the presentation of the corresponding hole in disk B. This is shown in Fig. 6$^a$.

I further propose in some instances to carry the steam directly from the valve M up to the whistle, having the whistle very closely attached to the valve, and to actuate it by the cams on the disk, which in this modification takes the place of the original index $B^1$.

Fig. 10 is a section showing a provision in which the upper cylinder, $B^2$, goes inside instead of outside of the lower cylinder, E, and all the parts are made tight and strong, and the joints made with packing. The top of the chamber is expanded to allow the steam access to any of the holes $c$ which may be presented. The steam is conducted, by a tube of rubber or other flexible material, to the bottom of the part E'. This allows the device to be worked by steam in the identical manner as air. I believe this form of the apparatus can be worked very successfully.

A pressure-regulating device may be introduced to avoid a too great pressure of steam, and to insure a uniformity of pressure in our apparatus independent of the variations which may obtain in the boilers.

Rigid tubes connected by flexible joints may be employed in place of a flexible tube for the peculiar connection; or a telescopic tube properly packed may be employed to supply steam in the center, and allow the apparatus to be turned in every position.

In each and all the forms the same, or substantially the same, provision is employed for instantly changing the index or its equivalent, $B^1$, at the top, and thereby bringing a different set of devices into action, which will induce the corresponding change in the signals. In each the signals given will consist of the same distribution of short and long sounds, and the same number and order will be made when the apparatus is adjusted for sailing in the same direction.

The code as here indicated may be varied by varying the corresponding parts of the mechanism. If, for example, it shall be found desirable to offer in all cases four sounds in succession in order to distinguish our signals from some local or rarely-used signal consisting of three sounds, (which have been sometimes proposed for indicating a condition of rest, as at anchor,) such change may be made in my code, care being taken to make the corresponding increased number and the proper order of the provisions for the sounds.

Various modifications may be made in the details without sacrificing all the advantages of the invention. I can increase the number of divisions. It may be possible, though I think it inexpedient, to provide a different signal for each of the thirty-two points of the compass; or, again, the invention may be worked in all its essential features with only four divisions for the cardinal points—north, east, south, and west; but I greatly prefer the division into eight, as above shown and described.

A spring may be used, either coiled within the bellows or otherwise arranged, to aid in returning the parts to their place after each operation, if it shall be found necessary; or a weight may be attached to the lower portion of the board G or to the cross-bar H. I have indicated a coiled spring in Fig. 7. It is marked S.

I claim as my invention—

1. The combination, with a source of supply of air or other fluid under pressure, of a fog-horn or other sound-producing instrument, D, a signal-disk, B, provided with a number of signal devices arranged in groups, a cylinder, $B^2$, attached to said disk, a cylinder, E, engaging with the cylinder $B^2$ by an inclined slot-and-pin connection, and mechanism for reciprocating the cylinder E, while permitting it to be turned, together with the signal-disk, at the end of a reciprocation to bring a new group of signal devices into action, substantially as described.

2. The combination, with a source of supply of air or other fluid under pressure, of a sound-producing instrument, D, a signal-disk, $B^1$, a cylinder, $B^2$, with an inclined slot attached to said disk, and a bar or treadle, I, connected with and arranged to actuate said cylinder $B^2$ by means of a pin working in the slot thereon, substantially as described.

3. The combination of a sound-producing instrument, D, a signal-disk, B, air-forcing apparatus G $g$, and mechanism, substantially as described, for simultaneously operating said air-forcing apparatus and signal-disk, substantially as set forth.

4. The slot $b^2$, helical in one portion of its length and straight at its lower end, adapted to serve in combination with the pin $e$, disk B, or its equivalent, sound-producing instrument D, and air-forcing means G $g$, arranged as shown, so as to cause the first portion of the motion to generate a pressure, and then to cause a turning of the signaling mechanism to a predetermined extent to give the signal, substantially as herein specified.

5. The entire slot $b^2$, formed helical at its mid-length and straight at its upper and lower ends, in combination with the bellows G $g$, actuating means E, signaling-disk B, or its equivalent, and sounding device D, adapted to allow not only the production of a wind-pressure during the first portion of the motion, and the operating of the signaling mechanism to a definite extent during a succeeding portion, but also to allow of a variation in the extent of the final movement without affecting the signals, substantially as herein specified.

6. In a signal apparatus for communicating by sound, the signal-disk B, provided with a series of perforations or equivalent signal devices, arranged in four or a greater number of groups corresponding with the divisions of a compass-dial, in combination with a source of supply of air or other elastic fluid under pressure, a fog-horn or equivalent sound-producing instrument, and mechanism, substantially as described, for vibrating said disk back and forth through an arc corresponding with one of said groups, while permitting the said disk to be shifted to bring a new group into action, substantially as set forth.

7. The combination, with a source of supply of air or other fluid under pressure, of a sound-producing instrument, D, a signal-disk, B, a cylinder, $B^2$, attached to said disk, a cylinder, E, engaging with the cylinder $B^2$ by an inclined slot-and-pin connection, and provided with an extension, E′, and a cross-bar, H, substantially as described.

8. The combination, with a sound-producing instrument, D, of a signal-disk, B, an air-forcing apparatus, G $g$, a cylinder, E, arranged to operate said disk B by an inclined slot-and-pin connection, and provided with an extension, E′, a cross-bar, H, and a bar or treadle, I, connected with said cross-bar, substantially as described.

In testimony whereof I have hereunto set my hand, this 17th day of April, 1879, in the presence of two subscribing witnesses.

WM. B. BARKER.

Witnesses:
W. COLBORNE BROOKES,
CHARLES C. STETSON.